US011922834B2

(12) United States Patent
Wang et al.

(10) Patent No.: US 11,922,834 B2
(45) Date of Patent: Mar. 5, 2024

(54) SPLICING COMPONENT AND SPLICED DISPLAY SCREEN

(71) Applicant: TCL CHINA STAR OPTOELECTRONICS TECHNOLOGY CO., LTD., Guangdong (CN)

(72) Inventors: Min Wang, Guangdong (CN); Yao Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 199 days.

(21) Appl. No.: 17/597,230

(22) PCT Filed: Dec. 16, 2021

(86) PCT No.: PCT/CN2021/138889

§ 371 (c)(1),
(2) Date: Dec. 29, 2021

(87) PCT Pub. No.: WO2023/103017

PCT Pub. Date: Jun. 15, 2023

(65) Prior Publication Data

US 2023/0177983 A1 Jun. 8, 2023

(30) Foreign Application Priority Data

Dec. 8, 2021 (CN) ......................... 202111490694.8

(51) Int. Cl.
*G09F 9/302* (2006.01)

(52) U.S. Cl.
CPC ................................. *G09F 9/3026* (2013.01)

(58) Field of Classification Search
CPC ..................................................... G09F 9/3026
See application file for complete search history.

(56) References Cited

U.S. PATENT DOCUMENTS 8,444,099 B1 * 5/2013 Kuo .................. G02F 1/133608
248/220.21
9,615,474 B2 * 4/2017 He ......................... F16M 11/08
10,317,007 B2 * 6/2019 Kludt ...................... F16B 2/065
(Continued)

FOREIGN PATENT DOCUMENTS

CN 104299528 A 1/2015
CN 104900150 A 9/2015
(Continued)

*Primary Examiner* — Lisa Lea-Edmonds
(74) *Attorney, Agent, or Firm* — HAMRE, SCHUMANN, MUELLER & LARSON, P.C.

(57) ABSTRACT

A splicing component and a spliced display screen are provided. In the splicing component provided by the embodiments of the present disclosure, splicing panels are aligned and preliminarily spliced through a first positioning structure and a second positioning structure. A first splicing part and a second splicing part are then connected through a connecting part. Therefore, a plurality of splicing panels are efficiently and seamlessly spliced through the splicing component. The splicing component provided by the embodiment of the present disclosure improves the mounting efficiency of a spliced display screen and simplifies the mounting mode.

20 Claims, 4 Drawing Sheets

(56) References Cited

U.S. PATENT DOCUMENTS

| | | | | |
|---|---|---|---|---|
| 10,995,787 | B2 * | 5/2021 | Cai | G09F 9/3026 |
| 11,049,424 | B2 * | 6/2021 | Cai | G02F 1/13336 |
| 11,122,695 | B2 * | 9/2021 | Yi | H05K 5/0217 |
| 11,244,933 | B2 * | 2/2022 | Wu | G09G 3/32 |
| 11,432,416 | B2 * | 8/2022 | Zhang | H05K 5/0021 |
| 11,711,900 | B2 * | 7/2023 | Zou | G02F 1/13336 361/807 |
| 11,746,948 | B2 * | 9/2023 | Wang | G01G 5/006 248/918 |
| 2015/0078812 | A1 * | 3/2015 | He | F16M 13/02 403/322.4 |
| 2019/0316623 | A1 * | 10/2019 | Cai | H05K 5/0021 |
| 2021/0005783 | A1 * | 1/2021 | Wu | G06F 3/1446 |
| 2021/0010631 | A1 * | 1/2021 | Wang | F16M 11/046 |
| 2021/0204418 | A1 * | 7/2021 | Qin | H05K 5/0017 |
| 2021/0378093 | A1 * | 12/2021 | Zheng | H05K 1/148 |
| 2022/0165184 | A1 * | 5/2022 | Zhang | F16M 13/022 |
| 2022/0415217 | A1 * | 12/2022 | Zhang | H01L 33/005 |
| 2023/0267856 | A1 * | 8/2023 | Zhang | G09F 9/302 361/679.01 |

FOREIGN PATENT DOCUMENTS

| | | | |
|---|---|---|---|
| CN | 105118387 | A | 12/2015 |
| CN | 111336165 | A | 6/2020 |
| CN | 111405792 | A | 7/2020 |
| CN | 113450660 | A | 9/2021 |
| CN | 214476096 | U | 10/2021 |
| WO | 2021185137 | A1 | 9/2021 |

* cited by examiner

SPLICING COMPONENT AND SPLICED DISPLAY SCREEN

FIELD OF INVENTION

The present disclosure relates to the technical field of displaying, and particularly to a splicing component and a spliced display screen.

BACKGROUND OF INVENTION

With the continuous development of display technologies, displays are applied to more and more occasions. They are not only applied to televisions, monitors, industrial displaying, and medical displaying, but also increasingly applied to public display occasions. In public display applications, a display usually needs to have a larger display area to meet people's requirement for watching from a distance, a requirement for displaying a larger amount of information, and the like.

In the process of research and practice of the existing art, the inventor of the present disclosure found that the splicing application of display screens is often multi-screen linkage, requiring a large number of display modules. Furthermore, the bezel of a splicing screen, such as the bezel of an ultra narrow bezel (UNB) machine and the bezel of an extreme narrow bezel (ENB) machine, is ultra narrow, and no splicing joints are required visually. Therefore, an efficient splicing structural design is needed to ensure efficient screen installation and reduce the design of splicing joints.

SUMMARY OF INVENTION

Technical Problem

The embodiments of the present disclosure provide a splicing component and a spliced display screen, which can realize efficient splicing and reduce slicing joints.

Technical Solution

An embodiment of the present disclosure provides a splicing component, which includes:

a first splicing part, a first through hole and a first positioning structure being arranged on the first splicing part at an interval;

a second splicing part, a second through hole and a second positioning structure being arranged on the second splicing part at an interval, the first through hole corresponding to the second through hole; wherein the first positioning structure and the second positioning structure are used for aligning the first splicing part and the second splicing part; and a connecting part, passing through the first through hole and the second through hole to connect the first splicing part and the second splicing part.

In the splicing component provided in the embodiment of the present disclosure, the connecting part passes through the first through hole and the second through hole to connect the first splicing part and the second splicing part. Splicing panels are aligned and preliminarily spliced through the first positioning structure and the second positioning structure. The first splicing part and the second splicing part are then connected through the connecting part. Therefore, a plurality of splicing panels are efficiently and seamlessly spliced through the splicing component. The splicing component provided by the embodiment of the present disclosure improves the mounting efficiency of a spliced display screen and simplifies the mounting mode. Furthermore, it can be ensured that no splicing joints are formed between the splicing panels.

Alternatively, in some embodiments of the present disclosure, the first positioning structure and the second positioning structure are of tenon-and-mortise structures.

In the splicing component provided by the embodiment of the present disclosure, the tenon-and-mortise structures are used for positioning, so that positioning in different directions in a space can be realized, and the positioning is more accurate. In addition, by adopting the tenon-and-mortise structures, the first splicing part and the second splicing part can be firmly connected together, so that the first splicing part and the second splicing part will not easily shake.

Alternatively, in some embodiments of the present disclosure, the first positioning structure includes a first tenon, and the second positioning structure includes a first mortise.

the first tenon is arranged on one side of the first splicing part opposite to the second splicing part, and the first tenon and the first through hole are disposed at an interval; the first mortise is arranged on one side of the second splicing part opposite to the first splicing part; the first mortise is arranged corresponding to the first tenon; and when the first splicing part and the second splicing part are spliced, the first tenon is inserted into the first mortise.

In the splicing component provided by the embodiment of the present disclosure, the first tenon and the first mortise can firmly connect the first splicing part and the second splicing part, so that the first splicing part and the second splicing part will not easily shake.

Alternatively, in some embodiments of the present disclosure, the first positioning structure further includes a second mortise, and the second positioning structure further includes a second tenon.

the second mortise is arranged on the side of the first splicing part opposite to the second splicing part, and the second mortise are spaced apart from the first tenon and the first through hole; the second tenon is arranged on the side of the second splicing part opposite to the first splicing part; the second tenon is arranged corresponding to the second mortise; and when the first splicing part and the second splicing part are spliced, the second tenon is inserted into the second mortise.

In the splicing component provided by the embodiment of the present disclosure, the second tenon and the second mortise can firmly connect the first splicing part and the second splicing part, so that the first splicing part and the second splicing part will not easily shake. Furthermore, the first splicing part and the second splicing part can be aligned more accurately.

Alternatively, in some embodiments of the present disclosure, the first tenon and the second mortise are arranged on two sides of the first through hole, and the first mortise and the second tenon are arranged on two sides of the second through hole.

In the splicing component provided by the embodiment of the present disclosure, it can be ensured that the first splicing part and the second splicing part on two sides of the connecting part are closed. Furthermore, in this way, the first splicing part and the second splicing part can be better positioned.

Alternatively, in some embodiments of the present disclosure, the splicing component further includes a locking member. The locking member is arranged on at least one side of the connecting part and is used to lock the connecting part, the first splicing part, and the second splicing part.

In the splicing component provided by the embodiment of the present disclosure, the locking member can be used to fix the connecting part to prevent the connecting part from sliding out of the first through hole and the second through hole. In addition, the locking member can be further used to adjust a distance between the first splicing part and the second splicing part.

Alternatively, in some embodiments of the present disclosure, the first through hole and the second through hole are screw holes; the connecting part is a screw rod; and the connecting part is in threaded connection with the first through hole and the second through hole.

In the splicing component provided by the embodiments of the present disclosure, when the connecting part is a screw rod, a thread is correspondingly arranged between the first through hole and the second through hole. By means of threaded connection, the first splicing part and the second splicing part can be connected more stably. Furthermore, by the threaded connection, the distance between the first splicing part and the second splicing part can be adjusted by tightening or loosening the screw rod.

Alternatively, in some embodiments of the present disclosure, one side of the first through hole away from the second splicing part is provided with a buffer sheet, and one side of the second through hole away from the first splicing part is provided with a buffer sheet.

In the splicing component provided by the embodiment of the present disclosure, when the connecting part is tightened, a buffer layer is used to buffer a pressure stress acting on the first splicing part and the second splicing part to prevent the first splicing part and the second splicing part from deforming or being damaged under the tightening pressure.

Alternatively, in some embodiments of the present disclosure, grooves are dug in the first splicing part and the second splicing part; the first through hole is formed in a side wall of the groove, close to the second splicing part, in the first splicing part; the second through hole is formed in a side wall of the groove, close to the first splicing part, in the second splicing part; and the connecting part is accommodated in the grooves.

In the splicing component provided by the embodiments of the present disclosure, a first groove and a second groove are respectively formed in the first splicing part and the second splicing part, and the connecting part is accommodated in the first groove and the second groove, which can reduce the probability that the connecting part scratches an external object and protect the connecting part. In addition, the grooves can further form a handle which facilitates separation of the first splicing part from the second splicing part.

Alternatively, in some embodiments of the present disclosure, the splicing component further includes a cover plate. The cover plate is arranged on the grooves.

In the splicing component provided by the embodiments of the present disclosure, the cover plate is arranged on the grooves, so that parts in the grooves can be better protected, which further reduces the probability that the parts in the grooves scratch the external object.

Correspondingly, an embodiment of the present disclosure further provides a spliced display screen, which includes:

at least one first display screen;

at least one second display screen, being correspondingly spliced with the first display screen; and a splicing component, comprising: a first splicing part, a first through hole and a first positioning structure being arranged on the first splicing part at an interval; a second splicing part, a second through hole and a second positioning structure being arranged on the second splicing part at an interval, the first through hole corresponding to the second through hole; wherein the first positioning structure and the second positioning structure are used to align the first splicing part and the second splicing part; and a connecting part, passing through the first through hole and the second through hole to connect the first splicing part and the second splicing part, at least one of the first splicing parts being arranged on a splicing side of at least one of the first display screens, and at least one of the second splicing parts being arranged on a splicing side of at least one of the second display screens.

In the spliced display screen provided by the embodiments of the present disclosure, one splicing component is adopted. The splicing component includes a first splicing part, a second splicing part, and a connecting part. A plurality of splicing panels are efficiently and seamlessly spliced through the splicing component. The splicing component provided by the embodiment of the present disclosure improves the mounting efficiency of a spliced display screen and simplifies the mounting mode. Furthermore, it can be ensured that no splicing joints are formed between the splicing panels.

Alternatively, in some embodiments of the present disclosure, the first positioning structure and the second positioning structure are of tenon-and-mortise structures.

In the spliced display screen provided by the embodiment of the present disclosure, the tenon-and-mortise structures are used for positioning, so that positioning in different directions in a space can be realized, and the positioning is more accurate. In addition, by adopting the tenon-and-mortise structures, the first splicing part and the second splicing part can be firmly connected together, so that the first splicing part and the second splicing part will not easily shake.

Alternatively, in some embodiments of the present disclosure, the first positioning structure includes a first tenon, and the second positioning structure includes a first mortise.

the first tenon is arranged on one side of the first splicing part opposite to the second splicing part, and the first tenon and the first through hole are disposed at an interval; the first mortise is arranged on one side of the second splicing part opposite to the first splicing part; the first mortise is arranged corresponding to the first tenon; and when the first splicing part and the second splicing part are spliced, the first tenon is inserted into the first mortise.

In the spliced display screen provided by the embodiment of the present disclosure, the first tenon and the first mortise can firmly connect the first splicing part and the second splicing part, so that the first splicing part and the second splicing part will not easily shake.

Alternatively, in some embodiments of the present disclosure, the first positioning structure further includes a second mortise, and the second positioning structure further includes a second tenon.

the second mortise is arranged on the side of the first splicing part opposite to the second splicing part, and the second mortise are spaced apart from the first tenon and the first through hole; the second tenon is arranged on the side of the second splicing part opposite to the first splicing part; the second tenon is arranged corresponding to the second mortise; and when the first splicing part and the second splicing part are spliced, the second tenon is inserted into the second mortise.

In the spliced display screen provided by the embodiment of the present disclosure, the second tenon and the second mortise can firmly connect the first splicing part and the second splicing part, so that the first splicing part and the second splicing part will not easily shake. Furthermore, the first splicing part and the second splicing part can be aligned more accurately.

Alternatively, in some embodiments of the present disclosure, the first tenon and the second mortise are arranged on two sides of the first through hole, and the first mortise and the second tenon are arranged on two sides of the second through hole.

In the spliced display screen provided by the embodiment of the present disclosure, it can be ensured that the first splicing part and the second splicing part on two sides of the connecting part are closed. Furthermore, in this way, the first splicing part and the second splicing part can be better positioned.

Alternatively, in some embodiments of the present disclosure, the splicing component further includes a locking member. The locking member is arranged on at least one side of the connecting part and is used to lock the connecting part, the first splicing part, and the second splicing part.

In the spliced display screen provided by the embodiment of the present disclosure, the locking member can be used to fix the connecting part to prevent the connecting part from sliding out of the first through hole and the second through hole. In addition, the locking member can be further used to adjust a distance between the first splicing part and the second splicing part.

Alternatively, in some embodiments of the present disclosure, the first through hole and the second through hole are screw holes; the connecting part is a screw rod; and the connecting part is in threaded connection with the first through hole and the second through hole.

In the spliced display screen provided by the embodiment of the present disclosure, when the connecting part is a screw rod, a thread is correspondingly arranged between the first through hole and the second through hole. By means of threaded connection, the first splicing part and the second splicing part can be connected more stably. Furthermore, by the threaded connection, the distance between the first splicing part and the second splicing part can be adjusted by tightening or loosening the screw rod.

Alternatively, in some embodiments of the present disclosure, an edge of the first splicing part does not exceed an edge of the first display screen, and an edge of the second splicing part does not exceed an edge of the second display screen.

In the spliced display screen provided by the embodiment of the present disclosure, the edge of each splicing part of the splicing component does not exceed the edge of each splicing panel, so that the splicing sides are not affected by the splicing component during splicing.

Alternatively, in some embodiments of the present disclosure, each splicing side is provided with a plurality of splicing components, and the splicing components on two adjacent first display screen and second display screen are disposed in a corresponding manner.

In the spliced display screen provided by the embodiment of the present disclosure, by means of adding the splicing components, the splicing panels can be better fixed to realize efficient splicing of a large-sized spliced display screen.

Alternatively, in some embodiments of the present disclosure, the plurality of splicing components are fixed on the first display screens and the second display screens through sliding rails.

In the spliced display screen provided by the embodiment of the present disclosure, the sliding rails can limit a moving trajectory of the first splicing parts or the second splicing parts, so as to guide the first splicing parts and the second splicing parts to be inserted and improve the splicing efficiency.

Beneficial Effects

An embodiment of the present disclosure provides a splicing component and a spliced display screen. The splicing component provided by the embodiment of the present disclosure has a first splicing part, a second splicing part, and a connecting part. A first through hole and a first positioning structure are arranged on the first splicing part at an interval. A second through hole and a second positioning structure are arranged on the second splicing part at an interval, and the first through hole corresponds to the second through hole. The first positioning structure and the second positioning structure are used to align the first splicing part and the second splicing part. The connecting part passes through the first through hole and the second through hole to connect the first splicing part and the second splicing part. Splicing panels are aligned and preliminarily spliced through the first positioning structure and the second positioning structure. The first splicing part and the second splicing part are then connected through the connecting part. Therefore, a plurality of splicing panels are efficiently and seamlessly spliced through the splicing component. The splicing component provided by the embodiment of the present disclosure improves the mounting efficiency of a spliced display screen and simplifies the mounting mode. Furthermore, it can be ensured that no splicing joints are formed between the splicing panels.

BRIEF DESCRIPTION OF DRAWINGS

To describe technical solutions in embodiments of the present disclosure more clearly, the following briefly introduces the accompanying drawings required for describing the embodiments. Apparently, the accompanying drawings in the following description show only some embodiments of the present disclosure, and a person skilled in the art may still derive other accompanying drawings from these accompanying drawings without creative efforts.

DETAILED DESCRIPTION OF PREFERRED EMBODIMENTS

Figure 1:
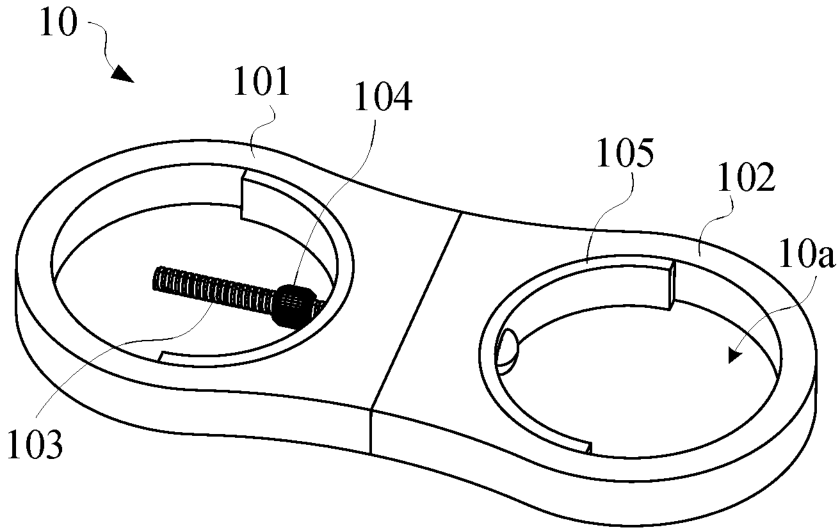
FIG. 1 is a first schematic structural diagram of a splicing component provided by an embodiment of the present disclosure.

The technical solutions in the embodiments of the present disclosure are clearly and completely described in the following with reference to the accompanying drawings in the embodiments of the present disclosure. Apparently, the embodiments to be described are merely some embodiments of the present disclosure rather than all of the embodiments. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure rather than limiting the present disclosure. In the present disclosure, without the contrary explanation, the directional terms such as "upper" and "lower" are usually used to refer to the top and bottom of the device in actual use or operating condition, specifically refer to the orientation of the drawing in the accompanying drawings; the terms "inside" and "outside" refer to the contours of the device.

Embodiments of the present disclosure provide a splicing component and a spliced display screen. Detailed descriptions are separately provided below. The description sequence of the following embodiments is not intended to limit preference orders of the embodiments.

Figure 2:
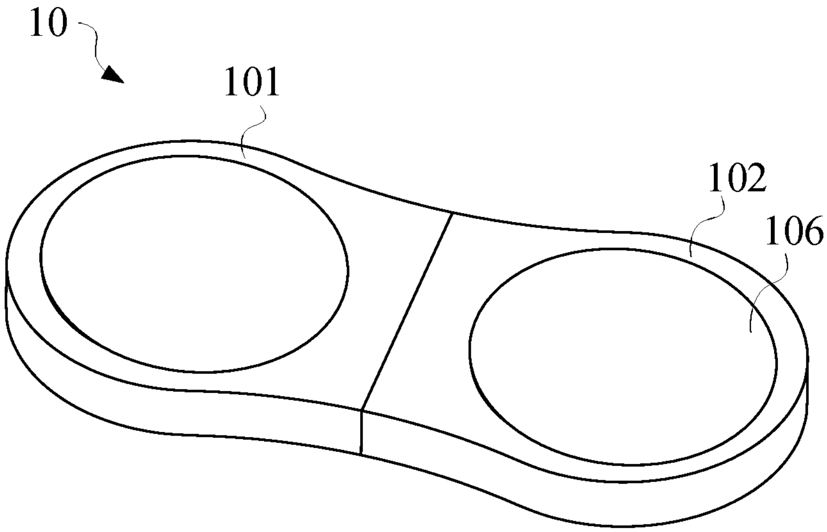
FIG. 2 is a second schematic structural diagram of a splicing component provided by an embodiment of the present disclosure.
Figure 3:
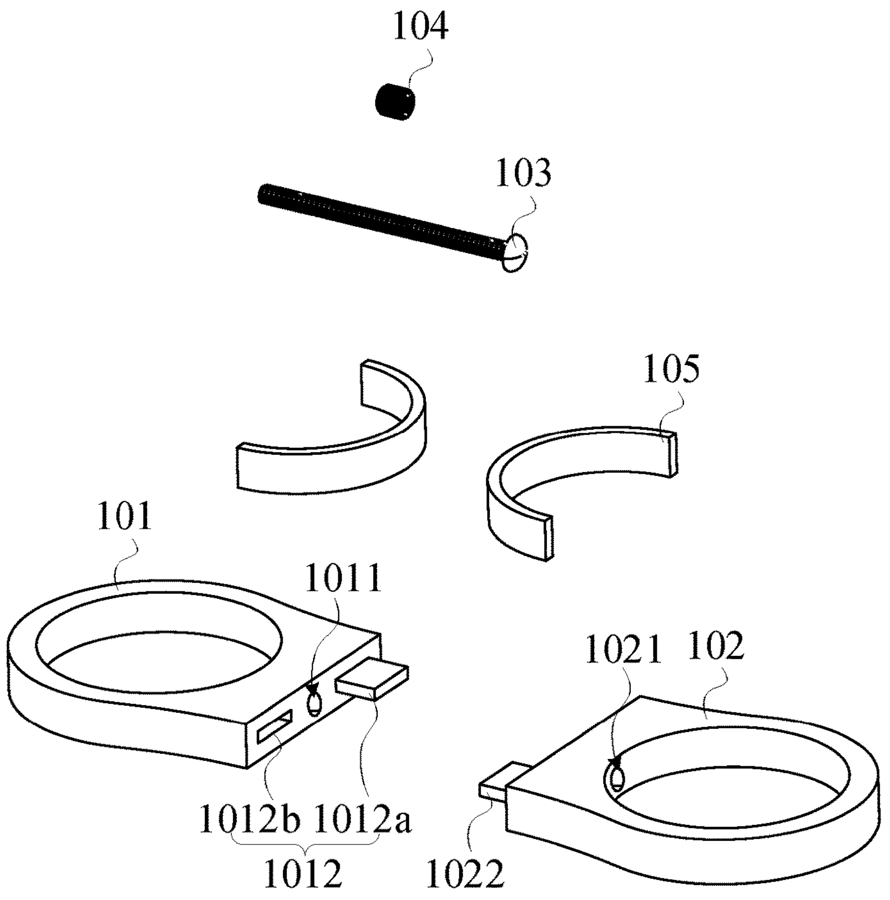
FIG. 3 is a schematic diagram of an exploded structure of a splicing component provided by an embodiment of the present disclosure.

Referring to FIG. 1 to FIG. 3, FIG. 1 is a first schematic structural diagram of a splicing component provided by an embodiment of the present disclosure. FIG. 2 is a second schematic structural diagram of a splicing component provided by an embodiment of the present disclosure. FIG. 3 is a schematic diagram of an exploded structure of a splicing component provided by an embodiment of the present disclosure. The splicing component 10 provided by the embodiment of the present disclosure includes a first splicing part 101, a second splicing part 102, and a connecting part 103. A first through hole 1011 and a first positioning structure 1012 are arranged on the first splicing part 101 at an interval. A second through hole 1021 and a second positioning structure 1022 are arranged on the second splicing part 102 at an interval. The first through hole 1011 corresponds to the second through hole 1021. The first positioning structure 1012 and the second positioning structure 1022 are used to align the first splicing part 101 and the second splicing part 102. The connecting part 103 passes through the first through hole 1011 and the second through hole 1021 to connect the first splicing part 101 and the second splicing part 102.

The splicing component 10 provided by the embodiment of the present disclosure has a first splicing part 101, a second splicing part 102, and a connecting part 103. A first through hole 1011 and a first positioning structure 1012 are arranged on the first splicing part 101 at an interval. A second through hole 1021 and a second positioning structure 1022 are arranged on the second splicing part 102 at an interval, and the first through hole 1011 corresponds to the second through hole 1021. The first positioning structure 1012 and the second positioning structure 1022 are used to align the first splicing part 101 and the second splicing part 102. The connecting part 103 passes through the first through hole 1011 and the second through hole 1021 to connect the first splicing part 101 and the second splicing part 102. Splicing panels are aligned and preliminarily spliced through the first positioning structure 1012 and the second positioning structure 1022. The first splicing part 101 and the second splicing part 102 are then connected through the connecting part 103. Therefore, a plurality of splicing panels are efficiently and seamlessly spliced through the splicing component 10. The splicing component 10 provided by the embodiment of the present disclosure improves the mounting efficiency of a spliced display screen and simplifies the mounting mode. Furthermore, it can be ensured that no splicing joints are formed between the splicing panels.

Alternatively, the first splicing part 101 and the second splicing part 102 are circular, and grooves **10*a* are dug in the first splicing part 101 and the second splicing part 102. The first through hole 1011 and the second through hole 1021 are formed in side walls of the grooves 10*a*, so that the connecting part 103 passes through the first through hole 1011 and the second through hole 1021 in the grooves 10*a*. Specifically, the first through hole 1011 is formed in the side wall of the groove 10*a*, close to the second splicing part 102, in the first splicing part 101; the second through hole 1021 is formed in the side wall of the groove 10*a*, close to the first splicing part 101, in the second splicing part 102; and the connecting part 103 is accommodated in the grooves 10*a*. This design can protect the connecting part 103 and prevent the connecting part 103 from being exposed to the outside and worn. In addition, the grooves 10*a* can further form a handle which facilitates separation of the first splicing part 101 from the second splicing part 102. Alternatively, a depth of the groove 10*a* may be less than a thickness of the first splicing part 101 and the second splicing part 102, or the grooves 10*a* penetrate through the first splicing part 101 and the second splicing part 102**.

It can be understood that the first splicing part 101 and the second splicing part 102 can also be arranged in other shapes. The embodiment of the present disclosure takes a circular shape as an example in order to make the splicing component more beautiful. In addition, the shapes of the disk splicing parts are also more convenient for assembling and machining. Furthermore, the first through hole 1011 and the second through hole 1021 may be directly provided without digging the grooves **10*a*. Digging the grooves 10*a*** can make the assembling more convenient during splicing, but is not the only limitation to the embodiment of the present disclosure.

Alternatively, the first positioning structure 1012 and the second positioning structure 1022 are of tenon-and-mortise structures. The tenon-and-mortise structures are used for positioning, so that positioning in different directions in a space can be realized, and the positioning is more accurate. In addition, by adopting the tenon-and-mortise structures, the first splicing part 101 and the second splicing part 102 can be firmly connected together, so that the first splicing part 101 and the second splicing part 102 will not easily shake.

Alternatively, the splicing component 10 further includes a locking member 104. The locking member 104 is arranged on at least one side of the connecting part 103 and is used for locking the connecting part 103, the first splicing part 101, and the second splicing part 102. Alternatively, the locking member 104 may be a component that can be used for fixing, such as a screw nut, a clamp, or a lock catch.

The locking member 104 provided by the embodiment of the present disclosure can be used to fix the connecting part

103 to prevent the connecting part 103 from sliding out of the first through hole 1011 and the second through hole 1021. In addition, the locking member 104 can be further used to adjust a distance between the first splicing part 101 and the second splicing part 102.

Alternatively, the first through hole 1011 and the second through hole 1021 are screw holes, and the connecting part 103 is a screw rod. The connecting part 103 is in threaded connection with the first through hole 1011 and the second through hole 1021. When the connecting part 103 is a screw rod, a thread is correspondingly arranged between the first through hole 1011 and the second through hole 1021. By means of threaded connection, the first splicing part 101 and the second splicing part 102 an be connected more stably. Furthermore, by the threaded connection, the distance between the first splicing part 101 and the second splicing part 102 can be adjusted by tightening or loosening the screw rod.

Further, a screw nut can be disposed at a tail of the screw rod to be used as the locking member 104 to improve the stability of the connection between the first splicing part 101 and the second splicing part 102. Moreover, the distance between the first splicing part 101 and the second splicing part 102 can be further adjusted by rotating the screw nut, and then the splicing joints of the splicing of the first splicing part 101 and the second splicing part 102 can be adjusted.

Alternatively, a buffer sheet 105 is arranged on one side of the first through hole 1011 away from the second splicing part 102, and a buffer sheet 105 is arranged on one side of the second through hole 1021 away from the first splicing part 101. The buffer sheet 105 may include at least one inorganic layer and at least one organic layer which are alternately stacked, or the buffer sheet 105 may be an inorganic layer or an organic layer. The inorganic layer may be selected from inorganic materials such as aluminum oxide, silicon oxide, silicon nitride, silicon oxynitride, silicon carbide, titanium oxide, zirconium oxide, and zinc oxide. The buffer sheet 105 may also be a gasket made of a metal material, such as any metal material of silver, aluminum, nickel, chromium, molybdenum, copper, tungsten, or titanium. The organic layer is selected from organic materials such as epoxy resin, polyimide, polyethylene terephthalate, polycarbonate, polyethylene, and polyacrylate. When the connecting part 103 is tightened, the buffer sheet 105 is used to buffer a pressure stress acting on the first splicing part 101 and the second splicing part 102 to prevent the first splicing part 101 and the second splicing part 102 from deforming or being damaged under the tightening pressure. In addition, since the buffer sheet 105 is made of a material with certain elasticity, when the connecting part 103 is loosened, the buffer sheet 105 can be further used to fill a gap between the first splicing part 101 and/or the second splicing part 102 and the connecting part 103, so as to prevent the first splicing part 101 and the second splicing part 102 from being separated from the connecting part 103.

The buffer sheet 105 can be directly manufactured into a shape adapting to the first splicing part 101 and the second splicing part 102 and is embedded on the first splicing part 101 and the second splicing part 102. Or, the buffer sheet is glued on the first splicing part 101 and the second splicing part 102 through an adhesive tape.

Alternatively, referring to FIG. 2, the splicing component 10 further includes a cover plate 106. The cover plate 106 is arranged on the groove 10*a*. Alternatively, the locking member 104 and the buffer sheet 105 are also accommodated in the grooves 10*a*. The cover plate 106 is arranged on the grooves 10*a*, so that parts in the grooves 10*a* can be better protected, which further reduces the probability that the parts in the grooves 10*a* scratch the external object.

Figure 4:
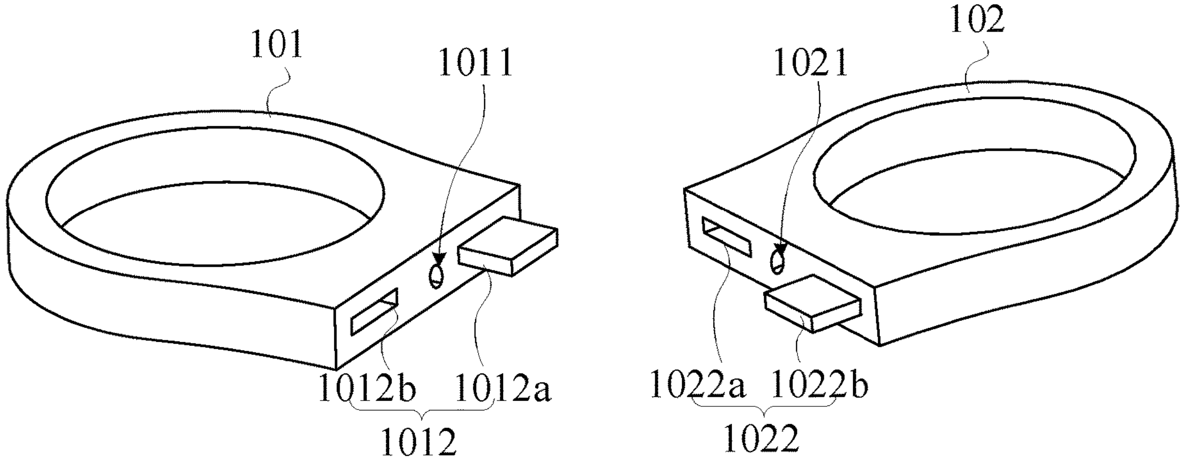
FIG. 4 is a schematic diagram of separation of a first splicing part and a second splicing part in a splicing component provided by an embodiment of the present disclosure.

Alternatively, referring to FIG. 3 and FIG. 4, FIG. 4 is a schematic diagram of separation of a first splicing part and a second splicing part in a splicing component provided by an embodiment of the present disclosure. The first positioning structure 1012 includes a first tenon 1012*a*. The second positioning structure 1022 includes a first mortise 1022*a*. The first tenon 1012*a* is arranged on one side of the first splicing part 101 opposite to the second splicing part 102. The first tenon 1012*a* and the first through hole 1011 are disposed at an interval. The first mortise 1022*a* is arranged on one side of the second splicing part 102 opposite to the first splicing part 101. The first mortise 1022*a* is arranged corresponding to the first tenon 1012*a*. When the first splicing part 101 and the second splicing part 102 are spliced, the first tenon 1012*a* is inserted into the first mortise 1022*a*.

The shape of the first tenon 1012*a* and the shape of the first mortise 1022*a* adapt to each other. The splicing of the first splicing part 101 and the second splicing part 102 is positioned through the first tenon 1012*a* and the first mortise 1022*a*, which can prevent the first splicing part 101 and the second splicing part 102 from moving after being positioned. In addition, the first tenon 1012*a* and the first mortise 1022*a* can firmly connect the first splicing part 101 and the second splicing part 102, so that the first splicing part 101 and the second splicing part 102 will not easily shake. In the first positioning structure 1012 and the second positioning structure 1022 provided by the embodiment of the present disclosure, there are one first tenon 1012*a* and one first mortise 1022*a*. The numbers and shapes of the first tenon 1012*a* and the first mortise 1022*a* can be adaptively changed according to an actual production need and a size of the splicing component 10. The present disclosure does not limit this.

Alternatively, referring to FIG. 4 again, the first positioning structure 1012 further includes a second mortise 1012*b*. The second positioning structure 1022 further includes a second tenon 1022*b*. The second mortise 1012*b* is arranged on the side of the first splicing part 101 opposite to the second splicing part 102. The second mortise 1012*b* is spaced apart from the first tenon 1012*a* and the first through hole 1011. The second tenon 1022*b* is arranged on the side of the second splicing part 102 opposite to the first splicing part 101. The second tenon 1022*b* is arranged corresponding to the second mortise 1012*b*. When the first splicing part 101 and the second splicing part 102 are spliced, the second tenon 1022*b* is inserted into the second mortise 1012*b*.

In the splicing component provided by the embodiment of the present disclosure, the second tenon 1022*b* and the second mortise 1012*b* can firmly connect the first splicing part 101 and the second splicing part 102, so that the first splicing part 101 and the second splicing part 102 will not easily shake. Furthermore, the first splicing part 101 and the second splicing part 102 can be aligned more accurately.

Alternatively, the first tenon 1012*a* and the second mortise 1012*b* are arranged on two sides of the first through hole 1011. The first mortise 1022*a* and the second tenon 1022*b* are arranged on two sides of the second through hole 1021. The first tenon 1012*a* and the second mortise 1012*b* are arranged on two sides of the first through hole 1011, and the first mortise 1022*a* and the second tenon 1022*b* are correspondingly arranged on two sides of the second through hole 1021, so that it can be ensured that the first splicing part 101 and the second splicing part 102 on two sides of the connecting part 103 are closed. Furthermore, in this way, the first splicing part 101 and the second splicing part 102 can be better positioned.

Figure 5:
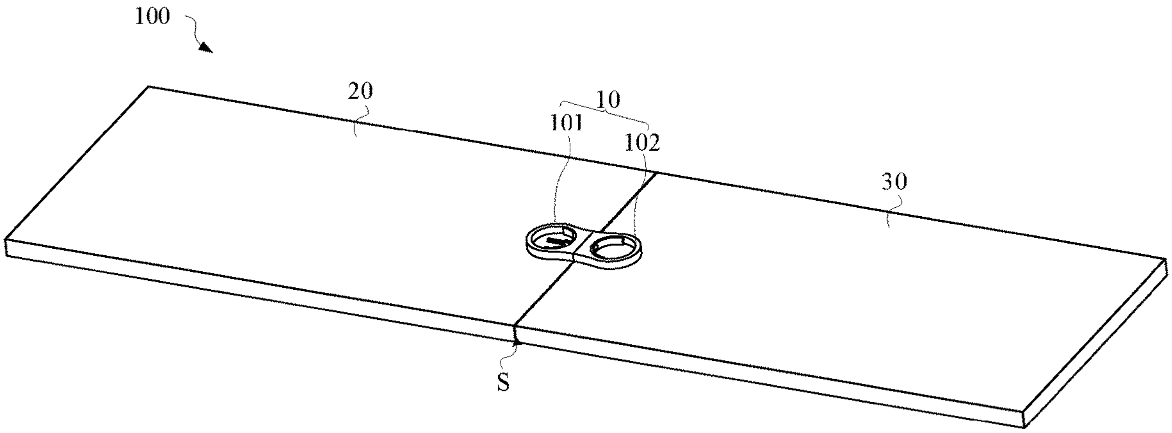
FIG. 5 is a schematic diagram of a first three-dimensional structure of a spliced display screen provided by an embodiment of the present disclosure.

Correspondingly, an embodiment of the present disclosure further provides a spliced display screen. Referring to FIG. 5, FIG. 5 is a schematic diagram of a first three-dimensional structure of a spliced display screen provided by an embodiment of the present disclosure. The spliced display screen 100 provided by the embodiment of the present disclosure includes at least one first display screen 20, at least one second display screen 30, and a splicing component 10. The second display screen 30 and the first display screen 20 are correspondingly spliced together. The splicing component 10 is the splicing component 10 described above. At least one first splicing part 101 is arranged on a splicing side S of one first display screen 20. At least one second splicing part 102 is arranged on a splicing side S of one second display screen 30. The first splicing part 101 and the second splicing part 102 are spliced and are used to splice the first display screen 20 and the second display screen 30.

The spliced display screen 100 provided by the embodiment of the present disclosure is spliced by adopting the splicing component 10. The splicing component 10 has a first splicing part 101, a second splicing part 102, and a connecting part. A first through hole and a first positioning structure are arranged on the first splicing part 101 at an interval. A second through hole and a second positioning structure are arranged on the second splicing part at an interval, and the first through hole corresponds to the second through hole. The first positioning structure and the second positioning structure are used to align the first splicing part 101 and the second splicing part 102. The connecting part passes through the first through hole and the second through hole to connect the first splicing part 101 and the second splicing part 102. Splicing panels are aligned and preliminarily spliced through the first positioning structure and the second positioning structure. The first splicing part 101 and the second splicing part 102 are then connected through the connecting part. Therefore, a plurality of splicing panels are efficiently and seamlessly spliced through the splicing component 10. The splicing component 10 provided by the embodiment of the present disclosure improves the mounting efficiency of the spliced display screen 100 and simplifies the mounting mode. Furthermore, it can be ensured that no splicing joints are formed between the splicing screens.

Figure 6:
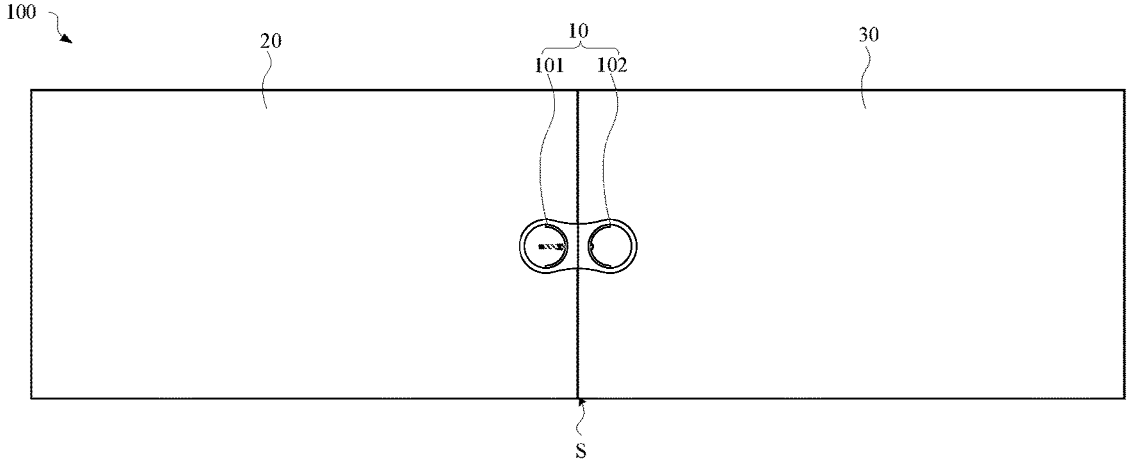
FIG. 6 is a schematic diagram of a first top-view structure of a spliced display screen provided by an embodiment of the present disclosure.

Alternatively, referring to FIG. 6, FIG. 6 is a schematic diagram of a first top-view structure of a spliced display screen provided by an embodiment of the present disclosure. An edge of the first splicing part 101 does not exceed an edge of the first display screen 20, and an edge of the second splicing part 102 does not exceed an edge of the second display screen 30. The edge of each splicing part of the splicing component 10 does not exceed the edge of each splicing panel, so that the splicing sides S are not affected by the splicing component 10 during splicing. Alternatively, the edge of the first splicing part 101 may be flush with the edge of the first display screen 20, and the edge of the second splicing part 102 may be flush with the edge of the second display screen 30, so as to ensure that the splicing sides S do not protrude, thereby ensuring that the splicing joints are minimized during the splicing. It can be understood that the edge of the first splicing part 101 may be slightly retracted relative to the edge of the first display screen 20, and the edge of the second splicing part 102 may be slightly retracted relative to the edge of the second display screen 30. That is, an orthographic projection of the first splicing part 101 on the first display screen 20 is within the first display screen 20. In this case, the splicing component 10 between two adjacent first display screen 20 and second display screen 30 may have a certain distance. However, by means of adjusting the connecting part 103, the fixing effect of the first splicing part 101 and the second splicing part 102 can also be realized.

Figure 7:
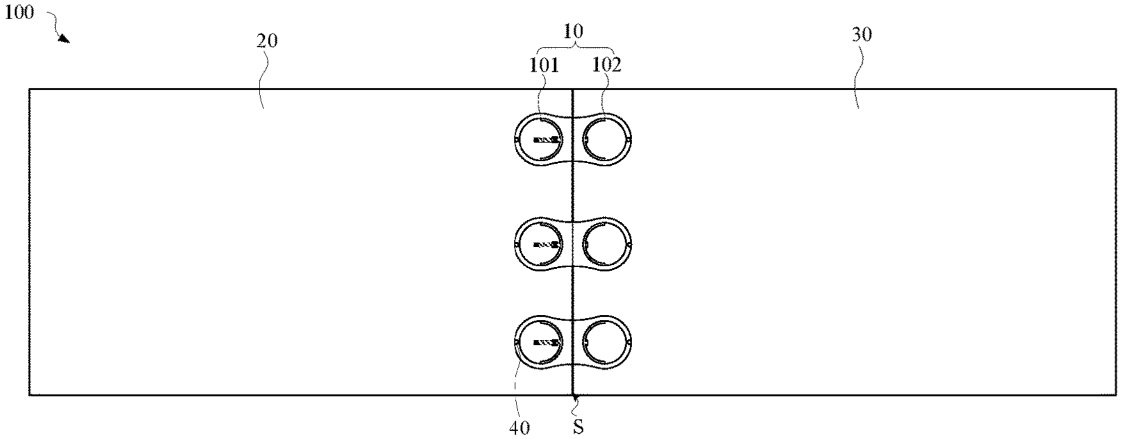
FIG. 7 is a schematic diagram of a second top-view structure of a spliced display screen provided by an embodiment of the present disclosure.

Alternatively, referring to FIG. 7, FIG. 7 is a schematic diagram of a second top-view structure of a spliced display screen provided by an embodiment of the present disclosure. Each splicing side S is provided with a plurality of splicing components 10. The plurality of splicing components 10 on two adjacent first display screen 20 and second display screen 30 are disposed in a corresponding manner. Specifically, the number of splicing components 10 disposed on each splicing side S can be selected according to the size of the spliced display screen 100. In some large-size panels, a length of the splicing side S is larger. When the splicing component 10 is used for splicing, in order to prevent the splicing component 10 from affecting the overall thickness and weight of the spliced display screen 100, the size of the splicing component 10 will not increase in proportion. Therefore, the number of splicing components 10 can be increased, and falling off of upper and lower ends provided with the splicing components 10 of a large-sized panel can be prevented. By means of adding the splicing components 10, the splicing panels can be better fixed, and efficient splicing of the large-sized spliced display screen 100 can be realized.

Alternatively, referring to FIG. 7 again, the splicing components 10 are fixed on the first display screen 20 and the second display screen 30 by threaded connection. For example, the first splicing part 101 and the first display screen 20 of each splicing component 10 are connected by a screw 40 and a screw hole, and the second splicing part 102 and the second display screen 30 of each splicing component 10 are connected by a screw 40 and a screw hole. Specifically, the screw holes are formed in back plates of the first display screen 20 and the second display screen 30, and then the first splicing part 101 and the second splicing part 102 are positioned through the screw holes, so that the edge of the first splicing part 101 does not exceed the edge of the first display screen 20, and the edge of the second splicing part 102 does not exceed the edge of the second display screen 30. It can be understood that the screw 40 has been installed in the screw hole in the figure, therefore, the screw hole is not shown in the figure. The splicing component can also be fixed on the first display screen 20 and the second display screen 30 by other connection methods, such as glue connection.

Figure 8:
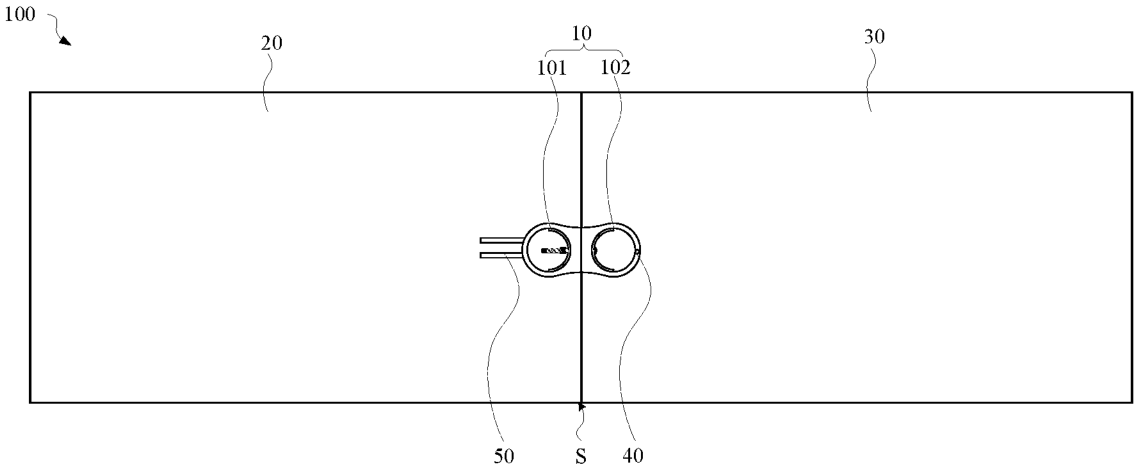
FIG. 8 is a schematic diagram of a third top-view structure of a spliced display screen provided by an embodiment of the present disclosure.

Alternatively, referring to FIG. 8, FIG. 8 is a schematic diagram of a third top-view structure of a spliced display screen provided by the embodiment of the present disclosure. The splicing component 10 is fixed on the first display screen 20 and the second display screen 30 by a sliding rail 50. The first splicing part 101 or the second splicing part 102 is slidably connected to the sliding rail 50 along an insertion direction. In this embodiment, the sliding rail 50 can define a moving trajectory of the first splicing part 101 or the second splicing part 102, so as to guide the first splicing part 101 and the second splicing part 102 to be inserted together and improve the splicing efficiency.

Alternatively, when the second splicing part 102 is slidably connected to the sliding rail 50, the first splicing part 101 may be directly fixed to a back surface of the first display screen 20 by glue, a screw, or other methods. The sliding rail 50 can be directly fixed to a back surface of the second display screen 30 by glue, screws, or other methods. The sliding rail 50 extends in the insertion direction. The sliding rail 50 is provided with the second splicing part 102. When the first display screen 20 and the second display screen 30 are spliced, the second splicing part 102 can slide on the sliding rail by pushing the second splicing part 102, and the second splicing part 102 can be inserted with the first splicing part 101.

Alternatively, when the first splicing part 101 is slidably connected to the sliding rail 50, the second splicing part 102 may be directly fixed to the back surface of the second display screen 30 by glue, a screw, or other methods. The sliding rail 50 can be directly fixed to the back surface of the first display screen 20 by glue, a screw, or other methods. The sliding rail 50 extends in the insertion direction. The sliding rail 50 is provided with the first splicing part 101. When the first display screen 20 and the second display screen 30 are spliced, the first splicing part 101 can slide on the sliding rail by pushing the first splicing part 101, and the first splicing part 101 is inserted with the second splicing part 102.

Alternatively, when the second splicing part 102 is slidably connected to the sliding rail 50, the second splicing part 102 is provided with a sliding chute; and the sliding rail 50 is embedded in the sliding chute, so that the second splicing part 102 is slidably connected to the sliding rail 50. In the same way, when the first splicing part 101 is slidably connected to the sliding rail 50, the same design can also be performed, which will not be repeated here. It can be understood that the sliding chute is arranged in a bottom of the first splicing part 101 or the second splicing part 102, and is arranged corresponding to the sliding rail 50. The design of the sliding chute is a technical means well known to those skilled in the art, so it is not shown in the figures.

It should be noted that the sliding rail 50 can also be arranged along a direction perpendicular to the insertion direction to push the first splicing part 101 or the second splicing part 102 to slide in the direction perpendicular to the insertion direction, so as to facilitate alignment.

A splicing component and a spliced display screen provided by the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not construed as a limit on the present disclosure.

What is claimed is:

1. A splicing component, comprising:

a first splicing part, wherein a first through hole and a first positioning structure are arranged on the first splicing part at an interval;

a second splicing part, wherein a second through hole and a second positioning structure are arranged on the second splicing part at an interval, the first through hole is corresponding to the second through hole; the first positioning structure and the second positioning structure are used for aligning the first splicing part and the second splicing part; and a connecting part passing through the first through hole and the second through hole to connect the first splicing part and the second splicing part.

2. The splicing component as claimed in claim 1, wherein the first positioning structure and the second positioning structure comprise tenon-and-mortise structures.

3. The splicing component as claimed in claim 2, wherein the first positioning structure comprises a first tenon, and the second positioning structure comprises a first mortise;

the first tenon is arranged on one side of the first splicing part opposite to the second splicing part, and the first tenon and the first through hole are disposed at an interval; the first mortise is arranged on one side of the second splicing part opposite to the first splicing part; the first mortise is arranged corresponding to the first tenon; and when the first splicing part and the second splicing part are spliced, the first tenon is inserted into the first mortise.

4. The splicing component as claimed in claim 3, wherein the first positioning structure further comprises a second mortise, and the second positioning structure further comprises a second tenon;

the second mortise is arranged on the side of the first splicing part opposite to the second splicing part, and the second mortise are spaced apart from the first tenon and the first through hole; the second tenon is arranged on the side of the second splicing part opposite to the first splicing part; the second tenon is arranged corresponding to the second mortise; and when the first splicing part and the second splicing part are spliced, the second tenon is inserted into the second mortise.

5. The splicing component as claimed in claim 4, wherein the first tenon and the second mortise are arranged on two sides of the first through hole, and the first mortise and the second tenon are arranged on two sides of the second through hole.

6. The splicing component as claimed in claim 1, wherein the splicing component further comprises a locking member, the locking member is arranged on at least one side of the connecting part and is used for locking the connecting part, the first splicing part, and the second splicing part.

7. The splicing component as claimed in claim 1, wherein the first through hole and the second through hole are screw holes; the connecting part is a screw rod; and the connecting part is in threaded connection with the first through hole and the second through hole.

8. The splicing component as claimed in claim 1, wherein one side of the first through hole away from the second splicing part is provided with a buffer sheet, and one side of the second through hole away from the first splicing part is provided with a buffer sheet.

9. The splicing component as claimed in claim 1, wherein a first groove is arranged in the first splicing part; a second groove is arranged in the second splicing part; the first through hole is formed in a side wall of the first groove close to the second splicing part; the second through hole is formed in a side wall of the second groove close to the first splicing part; and the connecting part is accommodated in the first groove and the second groove.

10. The splicing component as claimed in claim 9, wherein the splicing component further comprises a cover plate, and the cover plate is arranged on the grooves.

11. A spliced display screen, comprising:

at least one first display screen;

at least one second display screen, correspondingly spliced with the first display screen; and a splicing component, comprising: a first splicing part, a first through hole and a first positioning structure arranged on the first splicing part at an interval; a second splicing part, a second through hole and a second positioning structure arranged on the second splicing part at an interval, the first through hole corresponding to the second through hole; wherein the first positioning structure and the second positioning structure are used for aligning the first splicing part and the second splicing part; and a connecting part, passing through the first through hole and the second through hole to connect the first splicing part and the second splicing part, at least one of the first splicing parts is arranged on a splicing side of at least one of the first display screens, and at least one of the second splicing parts is arranged on a splicing side of at least one of the second display screens.

12. The spliced display screen as claimed in claim 11, wherein the first positioning structure and the second positioning structure comprises tenon-and-mortise structures.

13. The spliced display screen as claimed in claim 12, wherein the first positioning structure comprises a first tenon, and the second positioning structure comprises a first mortise;

the first tenon is arranged on one side of the first splicing part opposite to the second splicing part, and the first tenon and the first through hole are disposed at an interval; the first mortise is arranged on one side of the second splicing part opposite to the first splicing part; the first mortise is arranged corresponding to the first tenon; and when the first splicing part and the second splicing part are spliced, the first tenon is inserted into the first mortise.

14. The spliced display screen as claimed in claim 13, wherein the first positioning structure further comprises a second mortise, and the second positioning structure further comprises a second tenon;

the second mortise is arranged on the side of the first splicing part opposite to the second splicing part, and the second mortise are spaced apart from the first tenon and the first through hole; the second tenon is arranged on the side of the second splicing part opposite to the first splicing part; the second tenon is arranged corresponding to the second mortise; and when the first splicing part and the second splicing part are spliced, the second tenon is inserted into the second mortise.

15. The spliced display screen as claimed in claim 14, wherein the first tenon and the second mortise are arranged on two sides of the first through hole, and the first mortise and the second tenon are arranged on two sides of the second through hole.

16. The spliced display screen as claimed in claim 11, wherein the splicing component further comprises a locking member, the locking member is arranged on at least one side of the connecting part and is used for locking the connecting part, the first splicing part, and the second splicing part.

17. The spliced display screen as claimed in claim 11, wherein the first through hole and the second through hole are screw holes; the connecting part is a screw rod; and the connecting part is in threaded connection with the first through hole and the second through hole.

18. The spliced display screen as claimed in claim 11, wherein an edge of the first splicing part does not exceed an edge of the first display screen, and an edge of the second splicing part does not exceed an edge of the second display screen.

19. The spliced display screen as claimed in claim 11, wherein each splicing side is provided with a plurality of splicing components, and the splicing components on two adjacent first display screen and second display screen are disposed in a corresponding manner.

20. The spliced display screen as claimed in claim 11, wherein the plurality of splicing components are fixed on the first display screen and the second display screen through sliding rails.

* * * * *